United States Patent

Cote, Jr.

[11] 4,228,011
[45] Oct. 14, 1980

[54] FUEL OIL FILTER CARTRIDGE

[75] Inventor: Edmond H. Cote, Jr., Warren, R.I.

[73] Assignee: Fram Corporation, East Providence, R.I.

[21] Appl. No.: 32,081

[22] Filed: Apr. 23, 1979

[51] Int. Cl.² .............................................. B01D 27/06
[52] U.S. Cl. .................................. 210/232; 210/443; 210/445; 210/493 R
[58] Field of Search ................. 55/493, 497, 511, 521; 210/94, 232, 435, 443, 445, 493 R, 493 FR

[56] References Cited

U.S. PATENT DOCUMENTS

| | | | |
|---|---|---|---|
| 3,591,004 | 7/1971 | Roosa | 210/443 |
| 3,630,382 | 12/1971 | Hodgkins | 210/493 |
| 3,712,033 | 1/1973 | Gronholz | 210/493 |
| 3,929,648 | 12/1975 | Cuthbert | 210/445 |

Primary Examiner—Charles N. Hart
Assistant Examiner—Richard W. Burks
Attorney, Agent, or Firm—Ken C. Decker; William N. Antonis

[57] ABSTRACT

A refill filter cartridge for a liquid fuel filter includes a semi-rigid plastic "blister" having an open end closed by a cover member to define a fluid receiving compartment. A pleated paper filter medium in the compartment divides the latter into inlet and outlet portions which communicate with openings in the cover member. The filter housing includes a base and a cup-shaped glass housing that cooperates with the base to define a chamber which receives the plastic blister when the refill cartridge is installed in the filter. The cover member defines cooperating surfaces which engage the base and the glass housing so that the glass housing clamps the cover member between the glass housing and the filter base. The plastic blister is shaped to conform to the inner walls of the housing so that the housing engages the walls of the blister throughout their entire area. Accordingly, the glass housing serves as a support for the blister, so that the latter can withstand fluid pressure forces that would normally rupture the blister. In this way, a relatively inexpensive plastic blister can be used instead of a glass housing in the refill, and the filtering medium can be sealed to the sides of the blister instead of being sealed directly to the housing. Accordingly, the glass housing can be used over and over again, and need not be thrown away when the filter is changed.

9 Claims, 4 Drawing Figures

FUEL OIL FILTER CARTRIDGE

BACKGROUND OF THE INVENTION

This invention relates to a refill cartridge for a liquid filter.

The fuel supply for a compression ignition engine must be kept clean of particulate contaminants to assure proper operation of the engine. Accordingly, a liquid filter is normally installed in the fuel line of a compression ignition engine to assure that all contaminants will be removed from the fuel supply. Because of the sensitivity of the compression ignition engine to contaminants, the filter must be relatively sophisticated. It must also be possible to change the filtering medium periodically. One type of fuel filter used in such an application is disclosed in U.S. Pat. Nos. 3,591,004 and 3,630,382. One difficulty with the fuel filter disclosed in these patents is the fact that is uses a glass housing which holds the filtering medium. In order to assure proper sealing between the medium and the housing, it has been customary to provide refill cartridges which consist of the glass housing, the filtering medium sealed within the housing, and a base or cover member. However, since the glass housing, which is relatively expensive, must be replaced each time the filter cartridge is changed, this type of filter cartridge is relatively expensive. The glass housing must be used in order to withstand the relatively high internal pressures generated during use of the filter, and also to assure that the filtering medium is properly sealed to guard against bypass of contaminated fuel around the filtering medium.

Accordingly, the present invention provides a liquid filter for use in the fuel supply system for a compression ignition engine that provides a plastic bladder or blister which fits within the conventional glass housing used in the prior art. In this way, the filtering medium can be sealed within the blister, which would normally rupture if used alone in the relatively high pressure environment of the liquid filter. However, since the blister conforms exactly with the shape of the glass housing, the latter supports the blister to take the internal forces generated by the fluid pressure of the liquid.

SUMMARY OF THE INVENTION

In general, the invention provides a liquid filter having a base carrying inlet and outlet ports, and a cup-shaped housing which cooperates with the base to define a liquid receiving chamber communicating with the inlet and outlet ports. A retainer releasably secures the housing to the base. A filter cartridge includes a cover clamped between the cup-shaped housing and the base, and the cover has an inlet and an outlet communicating with the inlet port and outlet port respectively. A semi-rigid bladder has an open end sealed to said cover, and is shaped complementary to the shape of the inside of said housing so that when the filter cartridge is installed in the chamber the bladder is supported and restrained by the wall of the cup-shaped housing so that pressure within the compartment defined by the bladder and the cover is restrained by the support of the cup-shaped housing. A pleated filter element is provided in the compartment, and is sealed to the bladder and to the cover in order to divide the compartment into inlet and outlet portions communicating with the inlet and outlet respectively.

Accordingly, one advantageous effect of the invention is that the glass bowl normally used as a part of the replaceable cartridge used in prior art fuel filters of the same general type disclosed herein may be saved and used over and over again.

Another advantageous effect of the invention is that the cost of refill cartridges for liquid filters is reduced.

Still another advantageous effect of the invention is to provide a refill cartridge with a plastic blister for use in a fuel filter having a glass bowl which conforms exactly to the shape of the blister, so that the glass bowl supports the blister and permits it to withstand the relatively high internal pressures generated within the filter.

DETAILED DESCRIPTION

Figure 1:
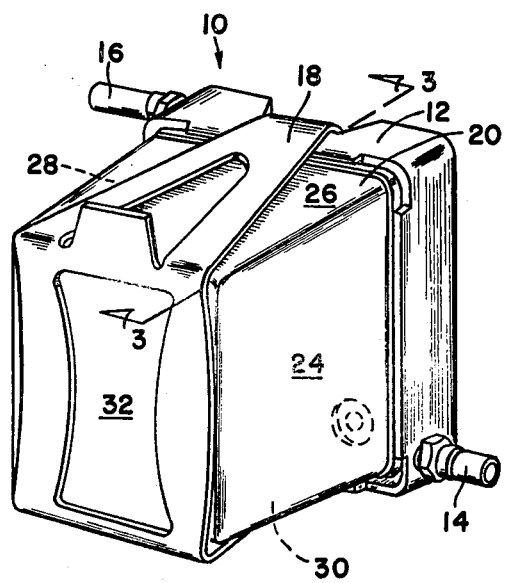
FIG. 1 is a perspective view of a filter assembly using a cartridge made pursuant to the teachings of the present invention.

Referring now to the drawings, a fluid filter assembly generally indicated by the numeral 10 has a base 12 provided with an inlet conduit 14 and an outlet conduit 16. A clamp 18 holds a cup-shaped housing 20 on the base 12. The cup-shaped housing 20 is preferably a glass bowl which cooperates with the base 12 to define a fluid receiving chamber 22 therebetween. The housing 20 includes side walls 24, 26, 28, and 30, which are enclosed by an end wall 32. The wall of the cup-shaped housing 20 opposite the end wall 32 is open and defines a peripheral edge 34 of the walls 24, 26, 28, and 30. The edge 34 is adapted to sealingly engage a clamping surface 36 which circumscribes the periphery of a cover portion 38 of a replaceable filter cartridge 40. The cartridge 40 is adapted to be received, at least partially, within the chamber 22 as will hereinafter become apparent.

Figure 2:
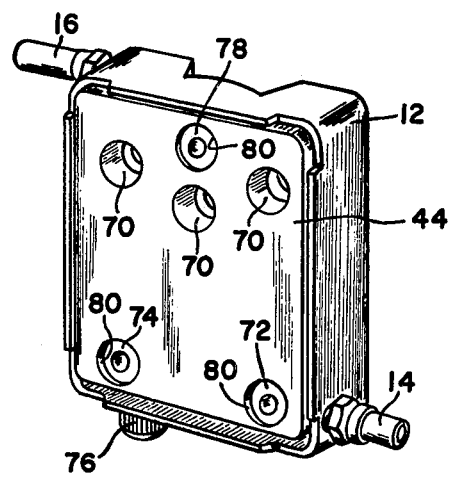
FIG. 2 is a perspective view similar to FIG. 1 but illustrating the base of the filter assembly with the filter cartridge removed.

A second peripheral sealing surface 42 on the side of the cover member 38 opposite to the sealing surface 36 is adapted to engage the sealing area 44 on the face 12 outlined by the dotted lines in FIG. 2. The cartridge 40 further includes a dome-shaped plastic blister or bladder member generally indicated by the numeral 46 which consists of side walls 48, 50, 52, and 54. The blister 46 further includes an end wall 56 opposite an open end generally indicated by the numeral 58. A perimetrically extending, outwardly projecting skirt 60 circumscribes the open end 58 and is designed to be captured by the rigid cover member 38 so that the compartment defined by the blister 46 and the cover member 38 is sealed against contamination during handling, and also provides a fluid-tight seal when the cartridge is installed in the chamber 22.

A pleated-paper filtering medium generally indicated by the numeral 62 is located within the cartridge 40 and consists of a longitudinal array of transversely extending pleats 64. The end pleats are sealingly secured to the walls 48 and 52, and the upper and lower edges of the pleats are sealed to the upper wall 56 of the blister 46 and to the cover member 38. Accordingly, the filtering media 62 divides the compartment 64 defined by the blister 46 and cover member 38 into an inlet section 66 and an outlet section 68. The walls 48, 50, 52, 54 and 56 of the blister 46 are adapted to engage the inner surfaces of the walls 24, 26, 28, 30 and 32 respectively, so that substantially the entire area of each of the surfaces of the walls on the blister engage the corresponding walls on the cup-shaped glass housing 20. The engagement is such that all voids or spaces are eliminated. Accordingly, when the refill cartridge is installed within the cup-shaped housing, the walls of the blister are supported by the walls of the cup-shaped glass housing, so that internal pressure levels that would normally rupture or distort the blister 46 are taken by the walls of the housing.

The base 12 is provided with bolt holes 70 so that the base can be mounted directly to the necessary support. Base 12 is also provided with inlet port 72 which communicates with the inlet conduit 14, a drain port 74 which is connected to a drain conduit (not shown) closed by a releasable plug 76, and an outlet port 78 which communicates with the outlet conduit 16. Each of the ports 72, 74, 78 are provided with circumferentially extending recesses 80 which circumscribe each of the ports 72, 74, and 78. The cartridge 40 is provided with an inlet port 82, a drain port 84, both of which communicate with the section 66, and an outlet port 86, which communicates with the section 68. Each of the ports 82, 84, and 86 are provided with circumferentially extending, outwardly projecting, relatively soft rubber grommets 88, which are adapted to sealingly engage with the corresponding recesses 80 when the cartridge is installed on the base 12.

Figure 3:
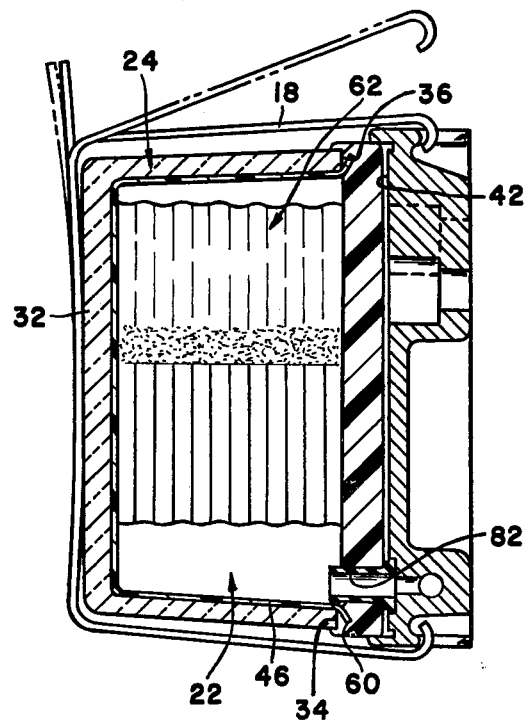
FIG. 3 is a cross-sectional view taken substantially along lines 3—3 of FIG. 1.
Figure 4:
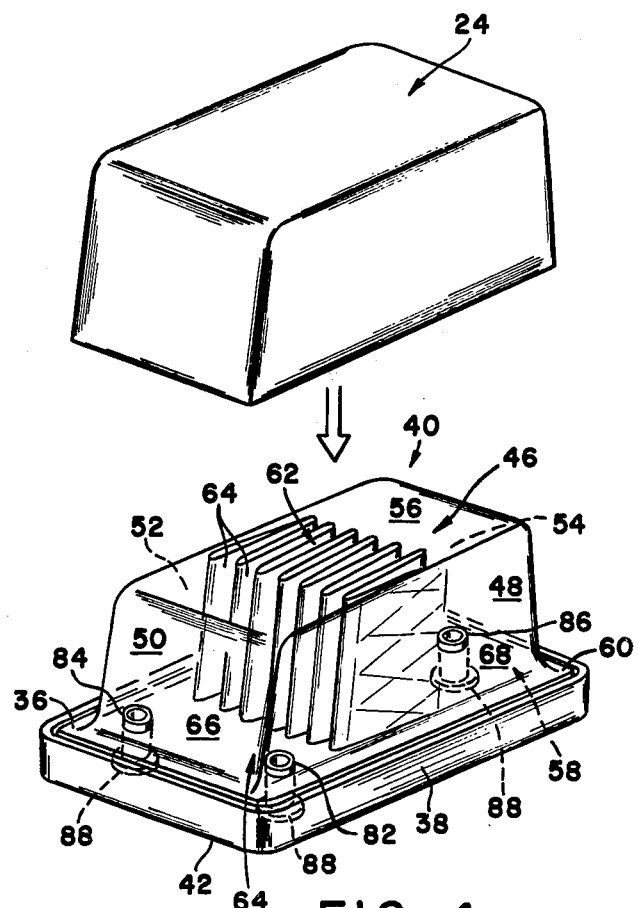
FIG. 4 is an exploded view illustrating the filter cartridge and its relationship to the glass bowl or housing member which clamps the filter cartridge to the base.

When the filter cartridge must be changed, the conventional clamp 18 is released as indicated by the dashed lines in FIG. 3, the cup-shaped housing 20 is removed, and the filter cartridge 40 is removed from the housing and from the base 12 and discarded. A new cartridge 40 is then installed upon the base 12 by fitting the grommets into the appropriate recesses, and then replacing the glass housing, so that the clamping edge 34 of the housing engages the sealing surface 36 of the cartridge 40 and the sealing surface 42 of the cartridge engages the sealing area 44 of the base 12. The clamp 18 is then reinstalled in the normal manner. Accordingly, the cartridge 40 is relatively inexpensive to manufacture, since the cup-shaped glass housing 20 is saved and used over again. Prior art refill cartridges sealed the filtering media 62 within the glass housing, thereby requiring that the glass housing be thrown away every time the filter was changed. The plastic blister depends upon the housing for its support, yet the cartridge 40 can be manufactured and sealed as a unit without use of the glass housing.

I claim:

1. In a liquid filter having a base carrying inlet and outlet ports, a cup-shaped housing cooperating with said base to define a liquid receiving chamber communication with said inlet and outlet ports, and retaining means for removably securing the housing to a cover, a filter cartridge including said cover clamped between said cup-shaped housing and said base, said cover having an inlet and an outlet communicating with the inlet port and outlet port respectively, and a semi-rigid bladder having an open end sealed to said cover to define a fluid pressure receiving compartment, said bladder being shaped complementary to the shape of the inside of said housing so that when the filter cartridge is installed in said chamber the bladder is supported and is restrained by the wall of said cup-shaped housing so that pressure within said compartment defined by the bladder and the cover is restrained by the support of the cup-shaped housing, a pleated filter element in said compartment, said pleated filter element being sealed to the bladder and to said cover in order to divide said compartment into inlet and outlet portions communicating with the inlet and outlet respectively.

2. The invention of claim 1:
wherein said housing and said bladder are substantially dome-shaped and each define inner and outer wall surfaces, the outer wall surface of said bladder conforming to the inner wall surface of said cup-shaped housing when the bladder is installed within said housing.

3. The invention of claim 2:
wherein said bladder is a semi-rigid plastic blister.

4. The invention of claim 2:
wherein said cup-shaped housing defines an open end, the perimeter of said open end defining an engaging surface engaging a complementary surface on said cover when the latter is clamped between the housing and the base, said bladder having an open end complementary to the open end of said housing so that the bladder can be installed in said housing through the open end of the housing, the perimeter of the open end of said bladder being sealed to said cover.

5. The invention of claim 4:
wherein the perimeter of said bladder comprises an outwardly projecting skirt which is captured by said cover to hold the bladder to the cover.

6. The invention of claim 1:
wherein said housing has an inner wall surface and the bladder has an outer wall surface, said outer wall surface engaging said inner wall surface through substantially the entire area of each of said surfaces, the engagement between said inner and outer surfaces being sufficiently tight that all voids or spaces therebetween are eliminated.

7. A filter cartridge for a liquid filter, said liquid filter comprising a base, a cup-shaped housing for said base cooperating with the latter to define a filter cartridge receiving chamber, said filter cartridge having a cover removably clamped between the cup-shaped housing and the base when the filter cartridge is installed, said cover carrying a semi-rigid bladder cooperating with said cover to define a fluid pressure receiving compartment, said bladder being received within said chamber when the filter cartridge is installed, said bladder being shaped to conform to the walls of said housing whereby the housing supports the bladder, said bladder being rupturable by the normal fluid pressures in said compartment during normal use of said liquid filter in the absence of the support for said bladder provided by said housing, a pleated filter element in said compartment, said filter element being sealed to the bladder and to said cover to divide said compartment into inlet and outlet portions, and inlet and outlet means carried by said cover communicating with said inlet and outlet portions respectively.

8. The invention of claim 7:
wherein said bladder is a semi-rigid plastic blister.

9. The invention of claim 7:
wherein said bladder has an open end closed by said cover and a perimetrically extending, outwardly projecting skirt circumscribing said open end and captured by said cover to thereby close said open end of the bladder.

* * * * *